United States Patent
Sharma

(10) Patent No.: US 11,316,832 B1
(45) Date of Patent: Apr. 26, 2022

(54) COMPUTER NETWORK DATA CENTER WITH REVERSE FIREWALL AND ENCRYPTION ENABLED GATEWAY FOR SECURITY AGAINST PRIVACY ATTACKS OVER A MULTIPLEXED COMMUNICATION CHANNEL

(71) Applicant: Analytical Wizards Inc., Iselin, NJ (US)

(72) Inventor: Ram Kumar Sharma, Iselin, NJ (US)

(73) Assignee: ANALYTICAL WIZARDS INC., Iselin, NJ (US)

( * ) Notice: Subject to any disclaimer, the term of this patent is extended or adjusted under 35 U.S.C. 154(b) by 235 days.

(21) Appl. No.: 16/752,648

(22) Filed: Jan. 25, 2020

Related U.S. Application Data

(60) Provisional application No. 62/797,255, filed on Jan. 26, 2019.

(51) Int. Cl.

| | | |
|---|---|---|
| *G06F 21/62* | (2013.01) | |
| *G06F 21/71* | (2013.01) | |
| *H04L 29/06* | (2006.01) | |
| *H04L 12/66* | (2006.01) | |
| *G06F 21/78* | (2013.01) | |
| *H04L 67/10* | (2022.01) | |
| *H04L 69/16* | (2022.01) | |

(52) U.S. Cl.
CPC ...... *H04L 63/0421* (2013.01); *G06F 21/6254* (2013.01); *H04L 12/66* (2013.01); *H04L 63/029* (2013.01); *H04L 63/0209* (2013.01); *H04L 63/0428* (2013.01); *H04L 63/1441* (2013.01); *H04L 67/10* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 9,792,658 | B1 * | 10/2017 | Vijendra | G06Q 50/01 |
| 10,936,744 | B1 * | 3/2021 | Trepetin | G06F 16/24 |
| 2012/0110680 | A1 * | 5/2012 | Oliver | G06F 21/6245 726/30 |
| 2012/0173338 | A1 * | 7/2012 | Ariel | G06F 16/355 705/14.53 |
| 2018/0165604 | A1 * | 6/2018 | Minkin | G06N 5/022 |
| 2018/0373885 | A1 * | 12/2018 | Arad | G06F 21/629 |

(Continued)

OTHER PUBLICATIONS

CN112667740. English Translation. (Year: 2021).*

(Continued)

*Primary Examiner* — Venkat Perungavoor
(74) *Attorney, Agent, or Firm* — TIPS Group

(57) ABSTRACT

A computer network data center includes a persistent storing device storing raw data from an external data source, a multi-core parallel modelling system coupled to the persistent storing device, and a gateway server coupled to the persistent storing device as a reverse firewall. In operation, the raw data in the persistent storing device is not erased, altered or destroyed. The multi-core parallel modelling system processes the raw data to provide anonymized information for an external user device. The gateway server has a communication channel for secure communication with external devices but prevents access to the raw data stored in the persistent storing device by the external devices.

16 Claims, 5 Drawing Sheets

(56) References Cited

U.S. PATENT DOCUMENTS

2019/0258824 A1* 8/2019 Gkoulalas-Divanis ...................... G06F 21/6254
2020/0210621 A1* 7/2020 Tong ...................... G16H 50/70

OTHER PUBLICATIONS

IDASH: integrating data for analysis, anonymization, and sharing. Ohno-Machado (Year: 2011).*
Variability Management in IaaS. Khan. IEEE. (Year: 2016).*
Big Data Security and Privacy Challenges:A Review. Javid. (Year: 2018).*
CN204669407. Guandong University of Technology. (Year: 2015).*
Efficient Privacy-Preserving Machine Learning in Hierarchical Distributed System. Jia. IEEE. (Year: 2019).*
Ecosystem of Electronic Health Record Databases in Venezuela. Clotet. (Year: 2014).*
Enhancing Security in Public Clouds using Data Anonymization Techniques. Nishara. IJCT. (Year: 2015).*

* cited by examiner

COMPUTER NETWORK DATA CENTER WITH REVERSE FIREWALL AND ENCRYPTION ENABLED GATEWAY FOR SECURITY AGAINST PRIVACY ATTACKS OVER A MULTIPLEXED COMMUNICATION CHANNEL

CROSS REFERENCE TO RELATED APPLICATION(S)

This application claims the benefit of provisional patent application U.S. Ser. No. 62/797,255, filed Jan. 26, 2019, incorporated herein by reference.

BACKGROUND

A data center is typically a building used to house computer systems and associated components. When provided with internet connectivity, they are sometimes referred to as Internet Data Centers (IDCs) or Cloud Data Centers (CDCs). Increasingly, the division of these terms have almost disappeared, and they are being integrated into the generic term "data center."

Data center security is an ongoing issue in that companies, large and small, are receiving and generating enormous amounts of sensitive data that can be the subject of privacy attacks. While data encryption, firewall technology, and other forms of security are useful in protecting against privacy attacks, methods to authenticate authorized parties and to deny access to determined data hackers have not been entirely effective.

These and other limitations of the prior art will become apparent to those of skill in the art upon a reading of the following descriptions and a study of the several figures of the drawing.

SUMMARY

A computer network data center with reverse firewall and encryption enabled gateway for security against privacy attacks over a multiplexed communication channel, set forth by way of example and not limitation, includes a persistent storing device, a multi-core parallel modelling system, and a gateway server. In this example, the persistent storing device stores raw data from at least one data source device that is external to the data center, the multi-core parallel modelling system is coupled to the persistent data storing device and is operative to process the raw data to provide anonymized information for at least one user device that is external to the data center, and the gateway server is provided with a multiplexed communication channel for secure communication with devices external to the data center including the at least one data source device and the at least one user device, where the gateway server is configured as a reverse firewall preventing access to the raw data stored in the persistent storing device via the multiplexed communication channel.

A computer implemented process, set forth by way of example but not limitation, includes: receiving at a gateway server configured as a reverse firewall a Request from a user for anonymized information; providing control commands from the gateway server to a multi-core parallel modeling system; retrieving secure data and processing parameters by the multi-core parallel modeling system; processing the secure data in parallel using multiple models on multiple cores of the multi-core parallel modeling system in accordance with the processing parameters; storing processed and anonymized information derived from the secure data; retrieving the processed and anonymized information by the gateway server to format and package a Response; and sending the Response from the gateway server to the user.

In a further example, non-transitory computer readable media with program instructions are provided for: receiving a Request from a user for anonymized information; providing control commands to a multi-core parallel modeling system; retrieving secure data and processing parameters; processing the secure data in parallel using multiple models on multiple cores of the multi-core parallel modeling system in accordance with the processing parameters; storing processed and anonymized information derived from the secure data; retrieving the processed and anonymized information by the gateway server to format and package a Response; and sending the Response from the gateway server to the user.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein similar components are provided with similar reference numerals. The example embodiments are intended to illustrate, but not to limit, the invention. The drawings include the following figures.

DETAILED DESCRIPTION OF EXAMPLE EMBODIMENTS

Figure 1:
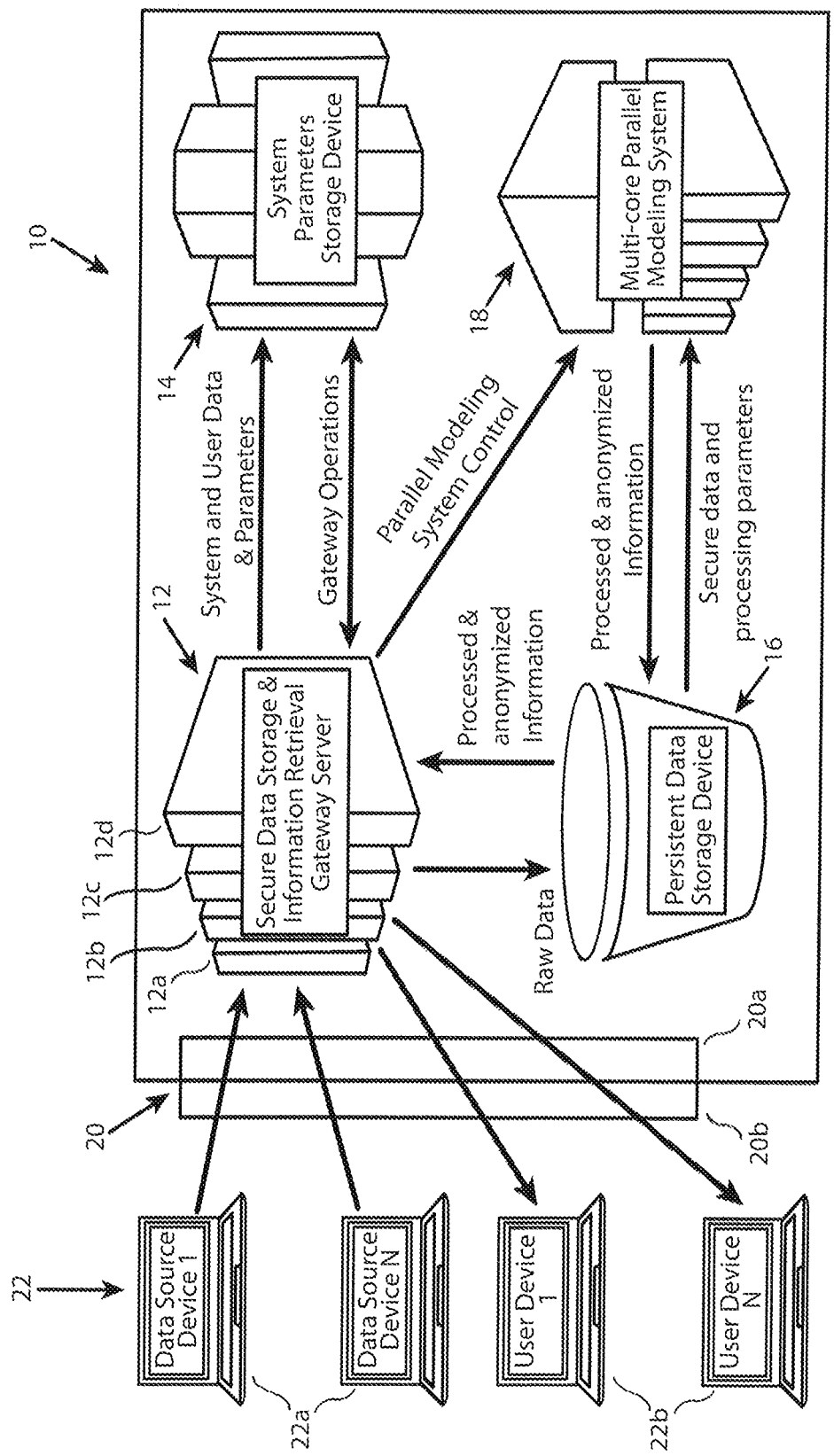
FIG. 1 is a block diagram of a computer network data center with reverse firewall and encryption enabled gateway for security against privacy attacks over a multiplexed communication channel.

FIG. 1 is an illustration of an example computer network data center 10 with reverse firewall and encryption enabled gateway for security against privacy attacks over a multiplexed communication channel, e.g. a TCP/IP protocol communication channel such at the internet. In this non-limiting example, the data center includes a gateway server 12, a system parameter data storing device 14 coupled to the gateway server, a persistent data storing device 16 coupled to the gateway server, and a multi-core parallel modeling system 18 coupled to the persistent storing device and receiving control signals from the gateway server 12. The gateway server is connected to a multiplexed communication channel 20 for communication with a plurality of devices 22 external to the data center. In particular, the gateway server 12 is receptive to raw data provided by a plurality of data source devices 22a that are coupled to the multiplexed communication channel 20 externally to the data center 10, and is operative to provide anonymized information to a plurality of user devices 22b coupled to the multiplexed communication channel 20 externally to the data center. It should be noted that a data source device 22a and a user device 22b can be implemented on the same computer, e.g. a laptop computer.

As used herein, "raw data" refers to data received from data sources 22a and stored in the persistent data storing device with no or little processing. It should be noted that the raw data might, and probably does, include confidential, personal or proprietary matter that becomes "secure" data when stored. Also as used herein, "anonymized information" includes information derived from the raw data that is cumulative and statistical in nature and which does not violate the privacy or proprietary rights of any entity.

The multiplexed communication channel 20 can comprise direct and/or local area network (LAN) links between the devices 22 and the gateway server 12, e.g. within a secure facility. For example, the multiplexed communication channel 20 can include a TCP/IP protocol communication channel. In this example, the devices 22 can be coupled to a local network interface 20b and the gateway server 12 can be coupled to an interface 20a that is in communication with an interface 20b to form the multiplexed communication channel 20. If none of the devices 22 or the gateway server 12 are coupled directly, or indirectly, to a wide area network (WAN), such as the internet, the data center 10 is considered to be "air gapped", i.e. physically separated from unsecured networks such as the internet to provide a high level of security against privacy attacks over the unsecured networks.

Often, the devices 22 and the gateway server 12 are connected via a WAN, such as the internet. For example, the multiplexed communication channel 20 may comprise a first network interface 20a of data center 10 that is coupled to the gateway server 12, and a second network interface 20b of, for example, an Internet Service Provider (ISP). It should be noted that the arrows between the devices 22 and gateway server 12 indicate logical connections between the devices 22 and server 12 and that the first network interface 20a and the second network interface 20b are typically physically separated, and not adjacent as shown in this non limiting example.

When the devices 22 and the gateway server 12 communicate via the internet the data and information carried by the multiplexed communication channel 20 is preferably secured with encryption. For example, a Hypertext Transfer Protocol Secure (HTTPS) protocol can be used to authenticate the gateway server 12 as well as protect the privacy and integrity of the exchanged data by protecting against main-in-the-middle attacks. Also, the bidirectional encryption of communications when using HTTPS protocols and other secure transmission protocols helps protect against eavesdropping and tampering with the multiplexed communications.

An important function of the gateway server 12 is to provide secure data storing and anonymized information delivery, particularly when the data center 10 is connected to the internet. This function is accomplished, at least in part, by securing the data received by the gateway sever 12 from the plurality of data source devices 22a, referred to herein a "raw data", from being accessed outside of the data center via the internet. To accomplish this, the gateway server 12 can be thought of as acting as a "a reverse firewall" that allows the raw data to be transmitted to the data center 10 from the data source devices 22a, but thereafter permitting no access to the raw data via the internet. In an embodiment, set forth by way of example and not limitation, this is accomplished by storing the raw data in persistent data storing device 16 by passing it through the gateway server 12, but then not allowing the gateway server to read the raw data from the data storing device 16. This is illustrated with the one-way arrow from the gateway server 12 to the persistent data storage device 16. As will be discussed in greater detail subsequently, only processed and anonymized information can be retrieved from the persistent data storing device 16 by the gateway server 12, which can then be provided to one or more user devices 22b via the multiplexed communication channel 20. As a result, raw data can never be retrieved or deleted, either by the original data source or by any user. Only processed and anonymized information derived from the raw data can be retrieved by authorized users from the data center 10.

Gateway server 12, in this non-limiting embodiment, comprises one or more web servers, e.g. web servers 12a, 12b, 12c and 12d, and can considered to be a "portal layer." As will be appreciated by those of skill in the art, in certain, non-limiting embodiments, inputs to the gateway server 12 from the devices 22 are through one or more of a firewall, load balancer, etc. Gateway server 12 is coupled to the system parameter data storing device 14 for the storing of data center and user data and parameters and to for communications to facilitate gateway operations. Gateway server 12 is also coupled to persistent data storing device 16 for the storing of raw data received from the data source devices 22a and to provide process and anonymized information to the gateway server for delivery to user devices 22b. As noted above, the gateway server 12 serves as a type of "reverse firewall" in that it is incapable of providing access to the raw data stored in the persistent data storing device 16. As mentioned earlier, the raw data received from the data source devices 22a never leaves the data center 10 and is considered to the "persistent" in that it is never erased, altered or destroyed. The gateway server 12 is also coupled to the multi-core parallel modeling system 18 to provide system control signals.

Figure 2:
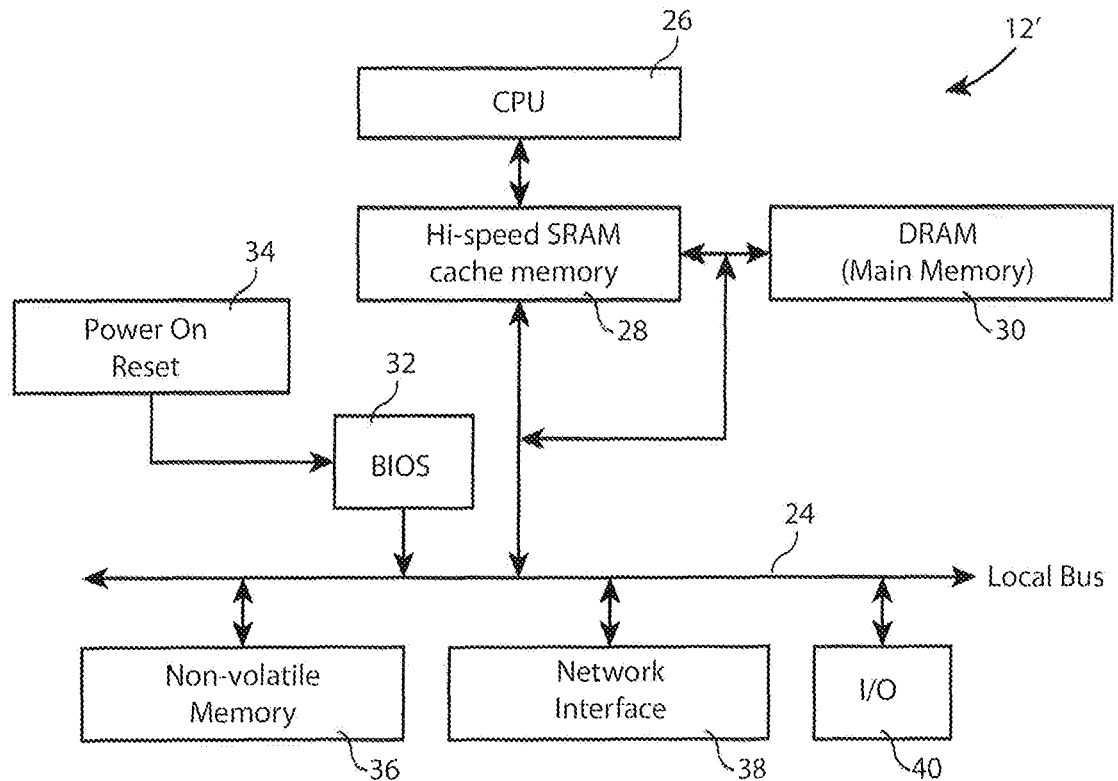
FIG. 2 is a block diagram of an example gateway server of the computer network data center of FIG. 1.

In FIG. 2, a gateway server 12', set forth by way of example and not limitation, includes a local bus 12 and a Central Processing Unit (CPU) 26 coupled to the local bus 24 by high-speed Static Random Access Memory (SRAM) cache memory 28. Dynamic Random Access Memory (DRAM) primary or "main" memory 30 is coupled to cache memory 28 and to the bus 24. Basic Input/Output System (BIOS) 32 is coupled to bus 24 and can be reset by power-on-reset 34. The gateway server 12' also includes non-volatile memory 36, such as "flash" memory, network interface 38, and other input/output (I/O) devices 40. It will be appreciated that this is only one suitable architecture for a gateway server 12, and that there are other suitable computer for a server, computer or computerized system of data center 10.

In a non-limiting embodiment, the gateway server 12 has a back end supported by the Python/Django systems. The web user interface can be implemented with React Java Script (JS), d3.js. The system parameter data storing device 14 can be implemented with a number of data structures but, in this non-limiting example, can be implemented as a Relational DB Management System (RDBMS) server.

Figure 3:
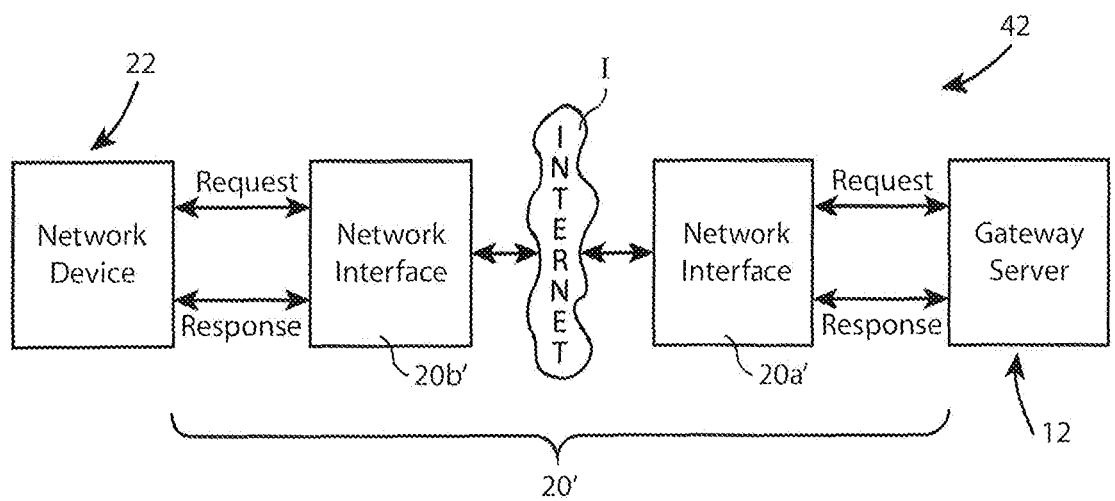
FIG. 3 is an illustration of an example multiplexed channel connection between a network device and the gateway server of the data computer network data center of FIG. 1.

FIG. 3 is an illustration 42 of a multiplexed communication channel 20' connection between a network device 22 and gateway server 12. In this example, the multiplexed communication channel 20' includes network interface 20a' (e.g., the network interface 38 of FIG. 2), the internet I, and network interface 20*b*'. As noted previously, a firewall (not shown) may be coupled between the network interface 20*a*' and gateway server 12, increasing the privacy and security of the data center 10 and protecting it specifically against attacks and generally against access that is not authorized. Network device 22 sends a Request to the gateway server 12, which it processes and eventually returns as a Response to the network device 22 via the multiplexed communication channel 20'. As used herein, "multiplexed communication channel" means any signal that the communication channel is divided into a plurality of logical sub-channels to allow the simultaneous transmission of multiple signals. In the example of the internet, it will be appreciated that multiple data packets comprising a plurality of signals that are transmitted bidirectionally, facilitating the multiplexed communication.

Persistent data storing device 16 is used to store both the raw data derived from the data source devices 22*a* and the processed and anonymized information developed by the multi-core parallel modeling system 18. By "persistent", it is meant that the raw data is, for all intents and purposes, permanently stored and retrievable only by the multi-core parallel processing system, which is isolated from the internet. A form of "persistent" data storing structure is an "appendable" data storing structure, such as one using an Apache Hive™ protocol, which provides a data storing software system built on top of Apache Hadoop for providing data summarization and analysis. The persistent data storing device 16 can be implemented in a number of physical technologies including semiconductor, magnetic and optical. For example, persistent data storing device can be a hard drive, a solid-state drive, and optical drive, etc.

Figure 4:
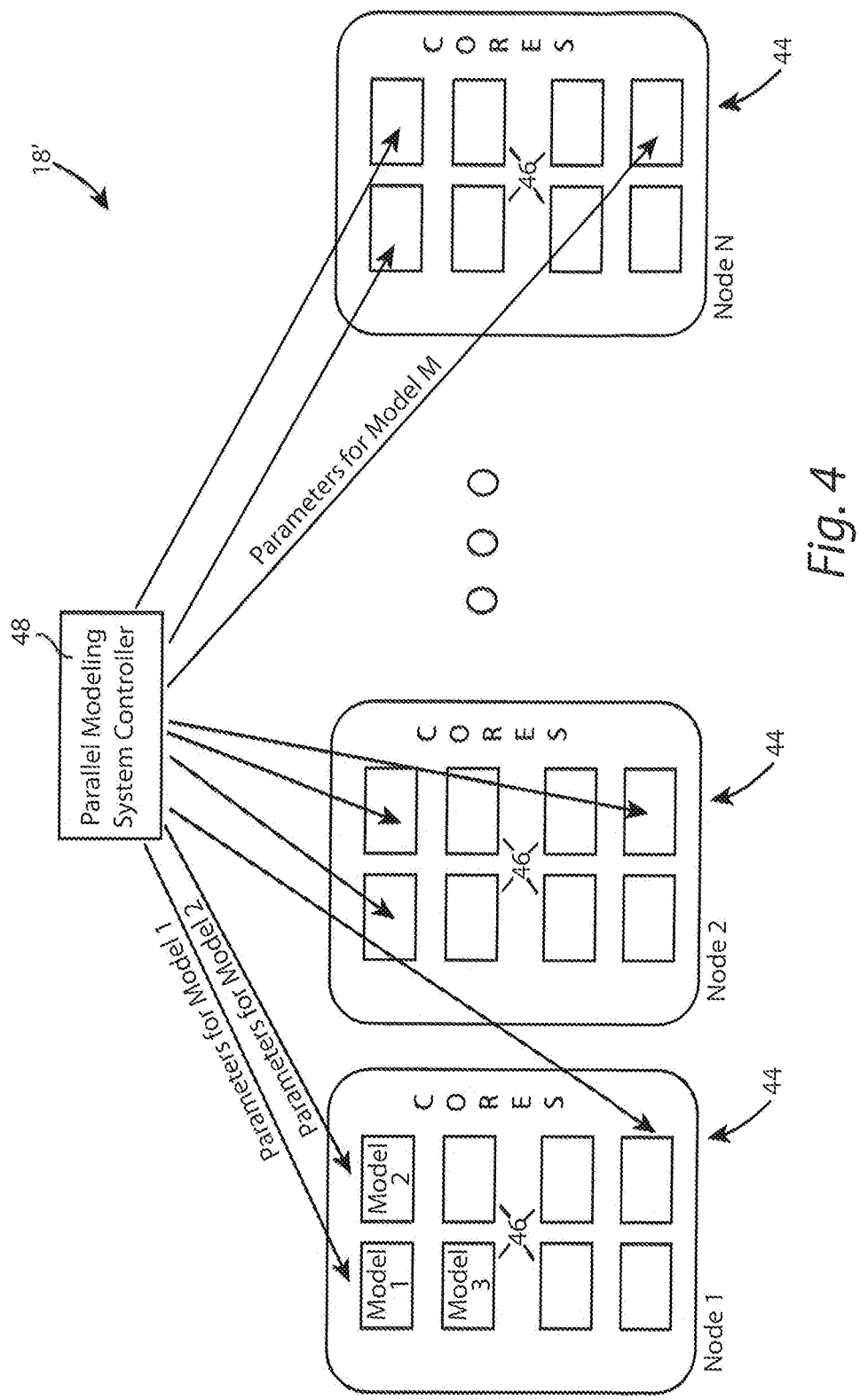
FIG. 4 is a block diagram of an example multi-core parallel processing system of the computer network data center of FIG. 1.

FIG. 4 is a block diagram of an example multi-core parallel processing system 18' of the computer network data center of FIG. 1. The system 18' includes N computing nodes 44, labelled here as Node 1, Node 2 . . . Node N. Each of the nodes 44 include a number "n" processing cores 46, and each core 46 can run a separate model, labelled here by way of example Model 1, Model 2, Model 3, etc. A parallel modeling system controller 48 provides the parameters for the models, and illustrated by the arrows labelled Parameters for Model 1, Parameters for Model 2 . . . Parameters for Model M. Therefore, for N nodes each of which has "n" cores, the maximum number of models M that can be processed simultaneously is M=n×N.

In a non-limiting example, a node 44 can be considered to be a multi-core processor, which is a computer processor integrated circuit with two or more processing units, called cores. Each core is capable of reading and executing program instructions independently, increasing the overall speed of the system for programs that support multithreading or other parallel computing techniques. Manufacturers typically integrate the cores onto a single integrated circuit die (known as a chip multiprocessor or CMP) or onto multiple dies in a single chip package. In this non-limiting example, each node 44 has eight cores, and the multi-core parallel processing system 18' has at total of N×8 cores capable of running N×8 models in simultaneously, by multithreading or other parallel computing techniques.

As will be appreciated, the multi-core parallel processing system 18' of FIG. 4 provides the ability to rapidly run a number of models against the raw data retrieved from persistent data storage device 16 and develop processed and anonymized information that can be provided by the gateway server 12 to a requesting user device. Without the parallel processing system, the anonymized information would be produced much more slowly and without the benefit of running a large number of models independently. This is a valuable attribute of data center 10 in that the raw data cannot be retrieved by any entity outside of the data center 10, and all of the processing of the raw data, now or in the future, will have to be done within the multi-core parallel modelling system.

In operation, gateway server 12 receives a Request from a device 22, it parses the Request, implements processes to fulfill the request, and formats a Response for the device 22. For example, when a data source device 22*a* makes a Request to store raw data, the gateway server receives the raw data using a suitable internet protocol such as the File Transfer Protocol (FTP) to receive the raw data for storing in the persistent data storage device 16. As another example, when a user device 22*b* sends a Request for anonymized information from the data center 10, the gateway server 12 retrieves gateway operations and user data and parameters from the system parameters data storage device 14 and send parallel modelling system control commands and parameters to the multi-core parallel modeling system 18, which then reads secure (raw) data and processing parameters from the persistent data storage device 16, processes the data in parallel using multiple models, and stores the processed and anonymized information in the persistent data storage device 18. The gateway 12 then formats and packages the Response before sending it to the user device 22*b* that made the request.

Figure 5:
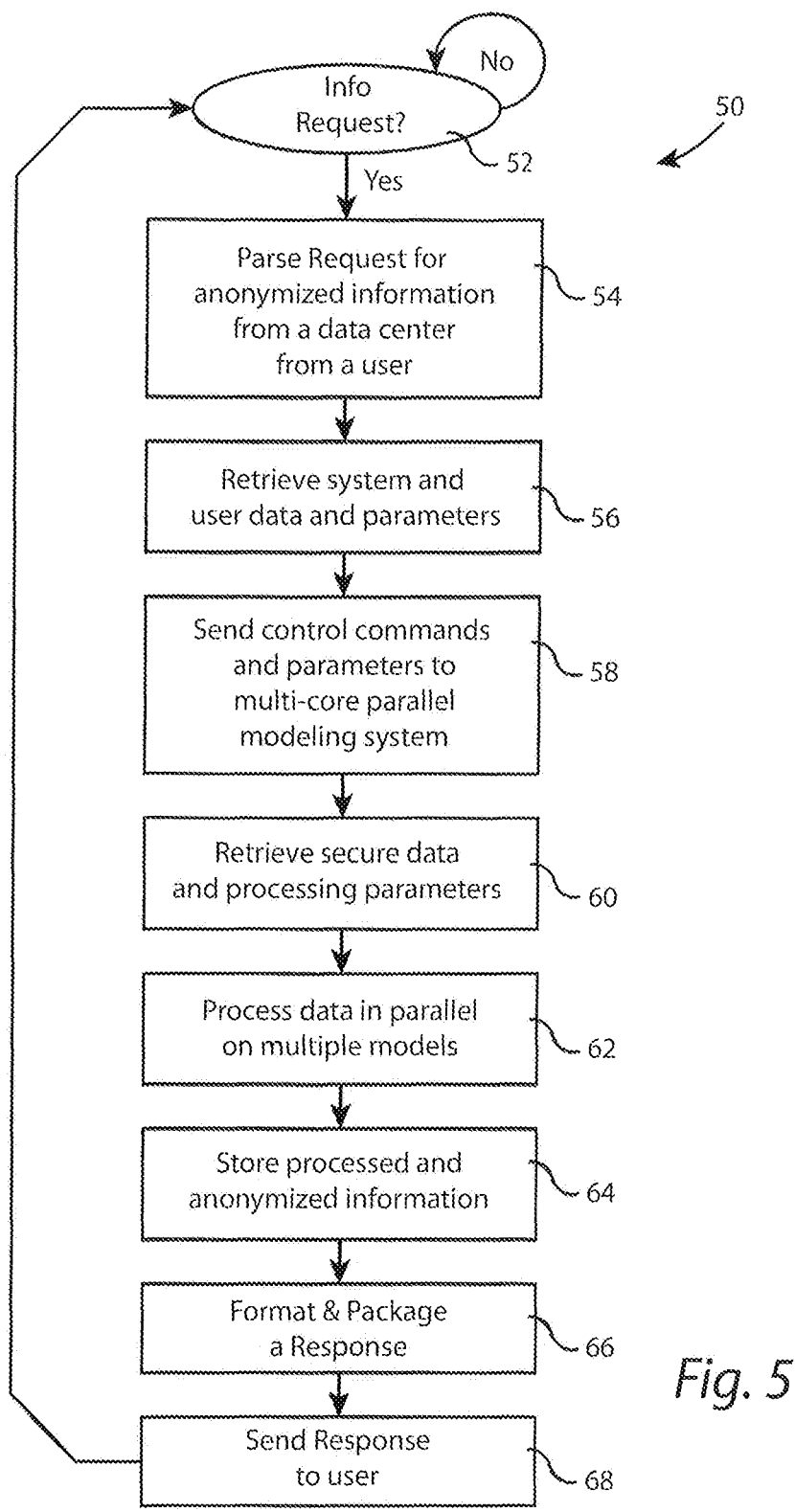
FIG. 5 is an example flow diagram of a process for the gateway server to handle a Request from a networked device.

FIG. 5 is an example flow diagram of a process 50 for the gateway server 12 to handle a Request from a networked device 22 for anonymized information. As noted previously, this Request is preferably sent via a secure protocol such as HTTPS and passes through a firewall for security reasons and to detect Requests that are, for example, part of a denial of service attack. When a proper and authorized Request for information is detected in an operation 52, an operation 54 parses the request and retrieves system and user data and parameters in an operation 56. Next, in an operation 58, control commands and parameters are sent to a multi-core parallel modeling system, and secure (raw) data and processing parameters are retrieved in an operation 60. Next, the raw data is processed in parallel with multiple models on multiple, independent cores in an operation 62, and the processed and anonymized information that respects privacy rights is stored by an operation 64. The anonymized information is formatted and packaged as a secure Response in an operation 66, and the Response is sent to the user who sent the Request in an operation 68. Process control then returns to operation 52 to await another Request for information.

Figure 6:
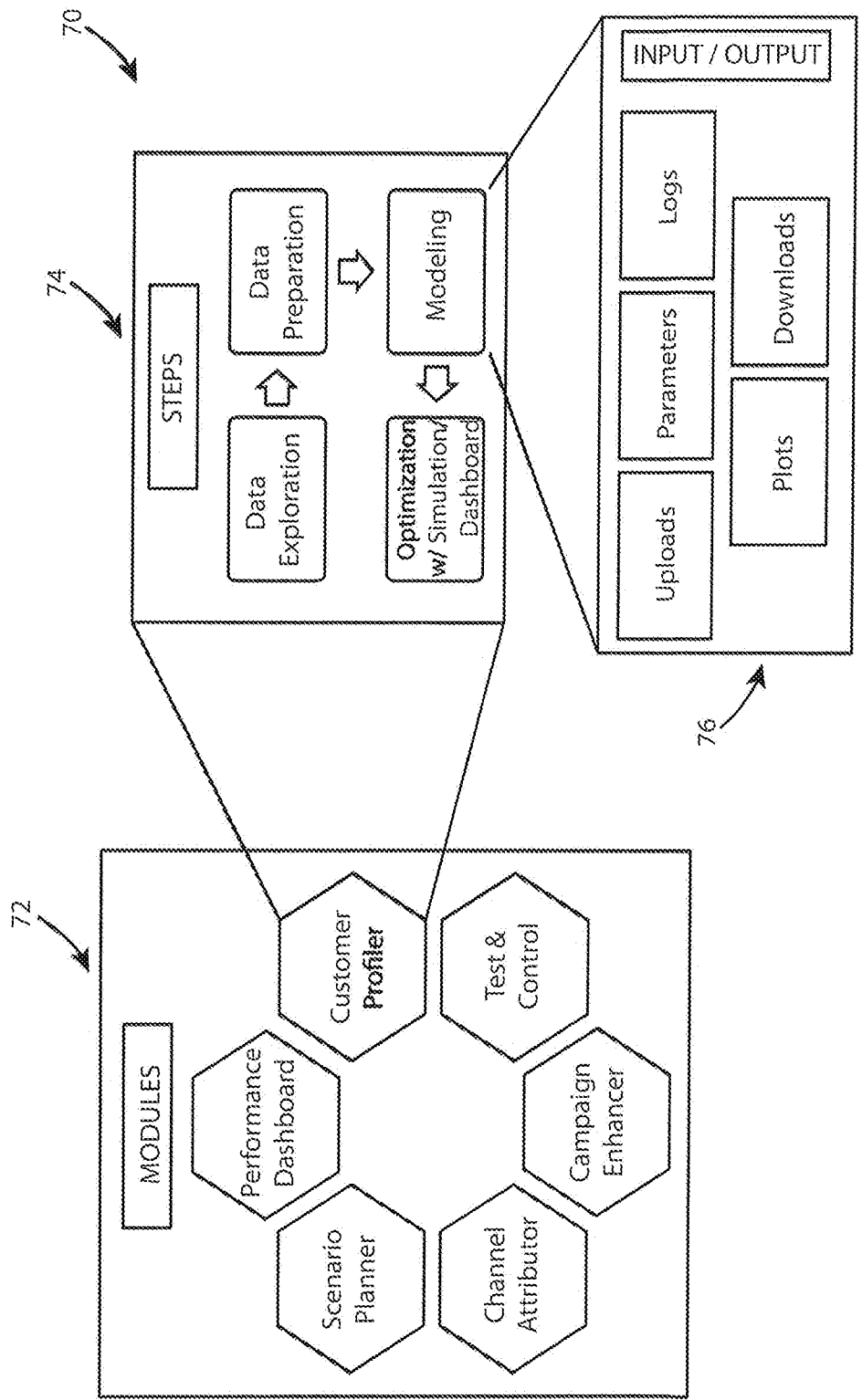
FIG. 6 is an illustration of a user's perspective when making a Request anonymized information from data center.

FIG. 6 is an illustration 70 of a user's perspective when making a Request anonymized information from data center 10. In this non-limiting embodiment, the gateway server 12 produces HTML to make a display 72 on a screen of a user device of a number of modules requesting different information derived from previously provided raw data. If the user selects the "customer profiler" module, the gateway server 12 will begin a multi-step process 74 including the steps of data exploration, data preparation, modeling, and displaying a simulation/dashboard on the screen of the user device. The modeling step 76 includes a number of input/output functions and the running of multiple models in parallel on a plurality of processor cores.

While the example of FIG. 6 is directed to customer profiling, other modules can address a variety of questions that companies face, such as understanding customer behavior, real time attribution, channel preference, scenario planning and test marketing. For example, the example of brand health visualization, customer segmentation, test marketing, channel/message preference, real time promotion and real time scenario planning.

Although various embodiments have been described using specific terminology, such description by way of example only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the following appended claims are understood to include the full spirit and scope of the invention disclosed herein.

What is claimed is:

1. A computer network data center with reverse firewall and encryption enabled gateway for security against privacy attacks over a communication channel comprising:
   a persistent storing device for storing raw data from at least one data source device that is external to the data center;
   a multi-core parallel modelling system coupled to the persistent data storing device operative to process the raw data to provide anonymized information for at least one user device that is external to the data center; and
   a gateway server provided with a communication channel for secure communication with devices external to the data center including the at least one data source device and the at least one user device, whereby the gateway server is configured as a reverse firewall preventing access to the raw data stored in the persistent storing device via the communication channel.

2. A computer network data center with reverse firewall and encryption enabled gateway for security against privacy attacks over a communication channel as recited in claim 1 wherein the raw data stored in the persistent storing device is not retrievable by the gateway server.

3. A computer network data center with reverse firewall and encryption enabled gateway for security against privacy attacks over a communication channel as recited in claim 1 wherein the multi-core parallel processing system includes multiple data models running on multiple physical processing cores.

4. A computer network data center with reverse firewall and encryption enabled gateway for security against privacy attacks over a communication channel as recited in claim 3 wherein the multi-core parallel processing system is isolated from the communication channel.

5. A computer network data center with reverse firewall and encryption enabled gateway for security against privacy attacks over a communication channel as recited in claim 1 wherein the gateway server comprises one or more web servers and the communication channel comprises a TCP/IP protocol communication channel.

6. A computer network data center with reverse firewall and encryption enabled gateway for security against privacy attacks over a communication channel as recited in claim 5 wherein the one or more web servers comprise a portal layer.

7. A computer network data center with reverse firewall and encryption enabled gateway for security against privacy attacks over a communication channel as recited in claim 1 wherein the gateway server passes the raw data from the at least one data source to the persistent storage device.

8. A computer network data center with reverse firewall and encryption enabled gateway for security against privacy attacks over a communication channel as recited in claim 7 wherein the gateway server receives processed and anonymized information from the persistent data storage device.

9. A computer network data center with reverse firewall and encryption enabled gateway for security against privacy attacks over a communication channel as recited in claim 8 wherein the gateway server provides parallel modelling system control commands to the multi-core modelling system.

10. A computer network data center with reverse firewall and encryption enabled gateway for security against privacy attacks over a communication channel as recited in claim 1 further comprising a system parameter data storing device coupled to the gateway server.

11. A computer network data center with reverse firewall and encryption enabled gateway for security against privacy attacks over a communication channel as recited in claim 10 wherein the gateway server provides system and user data and parameters to the system parameter data storing device.

12. A computer network data center with reverse firewall and encryption enabled gateway for security against privacy attacks over a communication channel as recited in claim 11 wherein the gateway server and the system parameter data storing device communicate for gateway operations.

13. A computer network data center with reverse firewall and encryption enabled gateway for security against privacy attacks over a communication channel as recited in claim 1 wherein the multi-core parallel modelling system comprises a plurality of computing nodes coupled to a parallel modelling system controller.

14. A computer network data center with reverse firewall and encryption enabled gateway for security against privacy attacks over a communication channel as recited in claim 13 wherein each of the plurality of computing nodes include a plurality of processing cores, each of which can independently execute code segments comprising a program model.

15. A computer implemented process comprising:
   receiving at a gateway server configured as a reverse firewall a Request from a user for anonymized information;
   providing control commands from the gateway server to a multi-core parallel modeling system;
   retrieving secure data and processing parameters by the multi-core parallel modeling system;
   processing the secure data in parallel using multiple models on multiple cores of the multi-core parallel modeling system in accordance with the processing parameters;
   storing processed and anonymized information derived from the secure data;
   retrieving the processed and anonymized information by the gateway server to format and package a Response; and
   sending the Response from the gateway server to the user.

16. Non-transitory computer readable media with program instructions for:
   receiving a Request from a user for anonymized information;
   providing control commands to a multi-core parallel modeling system;
   retrieving secure data and processing parameters;
   processing the secure data in parallel using multiple models on multiple cores of the multi-core parallel modeling system in accordance with the processing parameters;
   storing processed and anonymized information derived from the secure data;

retrieving the processed and anonymized information by the gateway server to format and package a Response; and sending the Response from the gateway server to the user.

* * * * *